April 28, 1964 L. W. TOBIN, JR 3,131,292
COORDINATE REFERENCE SYSTEM
Filed Nov. 29, 1957 2 Sheets-Sheet 1

INVENTOR.
Leo W. Tobin, Jr.
BY
E. W. Christen
ATTORNEY

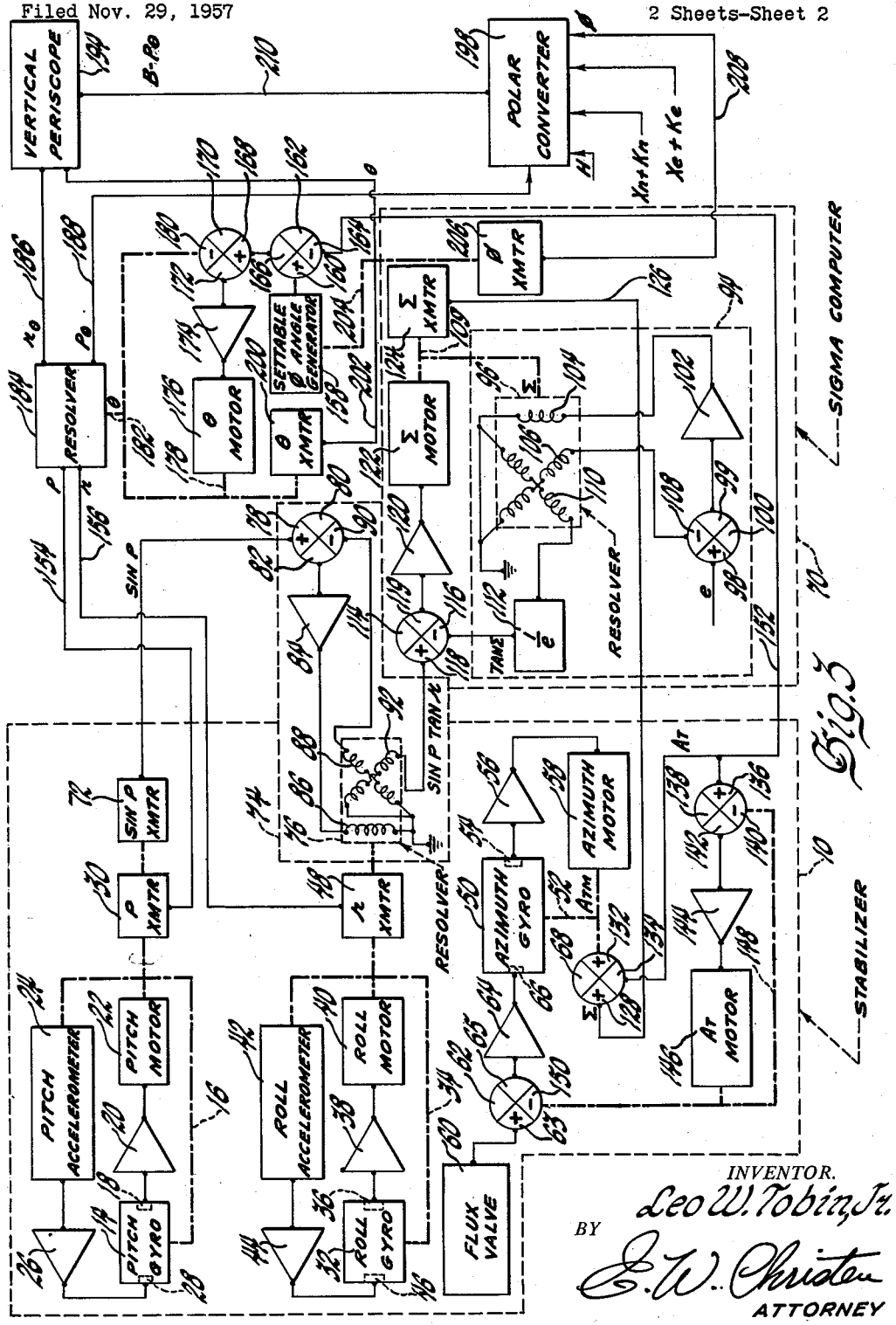

United States Patent Office 3,131,292
Patented Apr. 28, 1964

3,131,292
COORDINATE REFERENCE SYSTEM
Leo W. Tobin, Jr., Milwaukee, Wis., assignor to General Motors Corporation, Detroit, Mich., a corporation of Delaware
Filed Nov. 29, 1957, Ser. No. 700,253
15 Claims. (Cl. 235—151)

This invention relates to coordinate reference systems and more particularly to method and apparatus for providing a vehicle with a coordinate reference system which is stable relative to an external reference system.

A typical application of such coordinate reference systems is in the navigation of aircraft. Guidance is commonly achieved by reference to a coordinate system established within the aircraft prior to flight and in a predetermined orientation relative to an external reference system such as space, the earth, or celestial bodies. This orientation must be maintained throughout the flight of the aircraft. Heretofore, this has been accomplished by utilizing a stable platform in which a physical representation of the reference coordinate axes takes the form of a gimbal structure. Such stable platforms commonly utilize gyroscopes mounted upon the platform for sensing random disturbances of the relation between the coordinate axes and the orientation relative to the external reference system. The gyroscopes and associated computers develop stabilization signals which, through the intermediary of torque motors, interposed between the stable platform and the aircraft null the precessions of the gyroscopes caused by the random disturbances. Accordingly, the reference coordinate axes or gimbal axes of the stable platform are caused to remain in continuous alignment with the axes of the external reference system which they represent. With the coordinate reference axes thus established and maintained, acceleration measuring instruments may be mounted upon the stable platform to measure accelerations of the aircraft relative to any discrete point in the external reference system. The acceleration information permits computation of aircraft velocity and displacement for control of the aircraft steering system. The stabilization signals may be further utilized to stabilize instruments such as the optical periscope and radar antenna of a navigational system in a predetermined angular position independent of aircraft motion.

The stable platform type of coordinate reference system requires a complex mechanism and is subject to numerous disadvantages including space and weight factors in the aircraft design. Furthermore, the high accelerations of present day aircraft impose limitations upon the usefulness of the gimbal supported stable platforms.

In accordance with this invention, the stable platform structure is eliminated and the reference coordinate axes are represented by electrical signal quantities or shaft rotations in an analog or digital computer rather than by physical structure. The illustrative embodiment of the invention described herein is a coordinate reference system oriented relative to the earth's local vertical as an external reference. This is accomplished by use of a stabilizer carried by the aircraft and including gyroscopes and associated accelerometers which are mounted rigidly, except for rotational freedom about their input axes, with respect to the airframe. The input axes of the gyroscopes are mutually orthogonal and aligned respectively with the pitch, roll, and yaw axes of the aircraft. The gyroscope system is erected and initially oriented in such manner that the output axis of the pitch gyroscope, in a plane normal to the pitch axis, is aligned parallel with the local vertical direction thus defining a reference pitch plane. Similarly, the output axis of the roll gyroscope, in a plane normal to the roll axis, is aligned parallel with the local vertical direction thus defining a reference roll plane. Accordingly, the reference pitch and roll planes intersect in a line which defines the local vertical direction. The output axis of the azimuth gyroscope, in a reference azimuth plane mutually perpendicular to the line of intersection of the reference pitch and roll planes, is aligned with a predetermined direction relative to the north direction, referred to herein as a north-reference direction. The line of intersection of the pitch and roll reference planes and the direction of the azimuth gyroscope are sufficient to define mutually orthogonal reference coordinate axes which are aligned respectively with the local vertical direction, the north-reference direction and the mutually perpendicular direction. The signal quantities developed by the pitch gyroscope and the roll gyroscope represent, without modification, the angular displacement of the aircraft about the pitch and roll axes, respectively, from the corresponding reference axis. However, the signal quantity developed by the azimuth gyroscope represents a measured displacement or heading of the aircraft about the yaw axis and differs from the true heading by a quantity dependent upon the existing value of pitch and roll signal quantities. Accordingly, a computer is employed with the stabilizer to develop a signal quantity representative of the true heading of the aircraft relative to the corresponding reference coordinate axis. The signal quantities may be applied as control or stabilization signals to instruments on the aircraft requiring stabilization. It will be apparent as the description proceeds that the invention is equally applicable to coordinate reference systems oriented relative to any other external reference system.

A more complete understanding of this invention may be had from the detailed description of the illustrative embodiment which follows taken with the accompanying drawings in which:

FIGURE 3 is a diagrammatic representation of the stabilizer, the stabilization computer and typical utilization apparatus.

Figure 1:
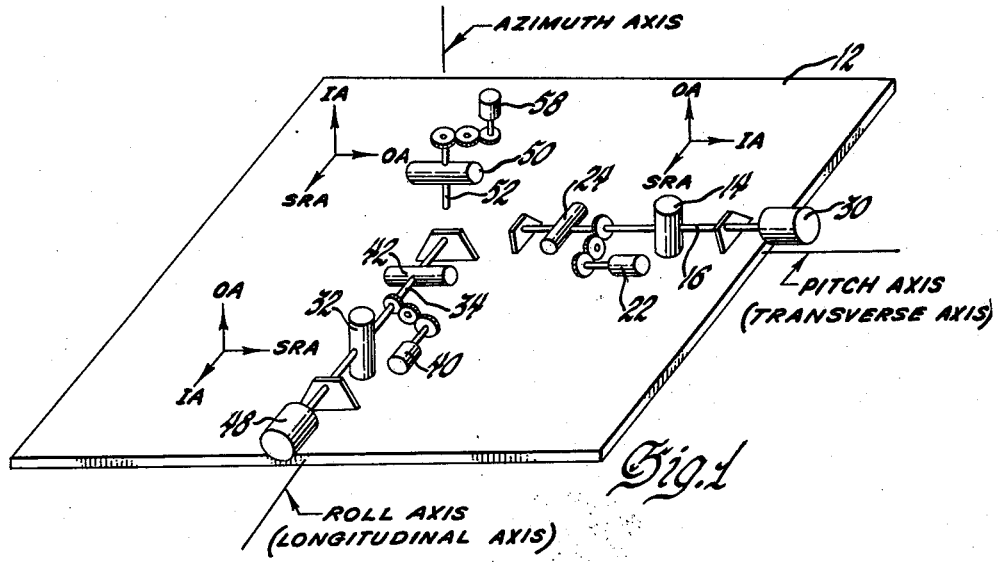
FIGURE 1 is a diagrammatic illustration of the stabilizer.

Referring now to the drawings, there is shown an illustrative embodiment of the invention in a coordinate reference system which develops signal quantities representative of the displacement of the aircraft pitch, roll, and yaw axes from reference coordinate axes which are oriented relative to the earth's local vertical and a north-reference direction throughout the flight of the aircraft. the system comprises, in general, the stabilizer 10 including motion sensing instruments which supplies signals to the heading correction or Sigma computer 70, which for illustrative purposes is of the analog type. Stabilization signals representative of the displacement between the coordinate reference axes and the aircraft axes are applied to typical utilization apparatus such as the vertical periscope 194.

The stabilizer 10 is shown diagrammatically in FIGURE 1 to illustrate the orientation of the sensing instruments relative to the aircraft and is shown in block diagram fashion in FIGURE 3 to show the system interconnection. The sensing instruments of the stabilizer include conventional gyroscopes and accelerometers. The gyroscopes are suitably single degree of freedom integrating gyroscopes which, when subjected to rotation about their input axes, precess about the output axis and develop a signal voltage corresponding to the input angular displacement. The accelerometers are of the linear type which develop an output voltage corresponding to the acceleration along the accelerometer input or sensitive axis. It will appear hereinafter that the accelerometers are sensitive to the direction of the local vertical and generate a signal voltage proportional to the displacement from the horizontal plane. The accelerometers are, however, subjected to variable inclination about their input axes and the output signal must be independent of such motion. Therefore, a conventional accelerometer having two degrees of freedom may be utilized with just one of its windings excited to meet this requirement.

In the stabilizer 10 the components are mounted upon a support member 12 which is rigidly connected with the airframe of the aircraft. A pitch gyroscope 14 is mounted for rotation about its input axis upon the rotatable shaft 16 which coincides with the pitch axis of the aircraft. With the input, output, and spin reference axes of the pitch gyroscope 14 oriented as indicated in FIGURE 1, the gyroscope responds to aircraft displacement about the pitch axis to produce precession about the output axis and the development thereby of a pitch signal in the signal generator 18. The signal generator 18 is coupled through the servo amplifier 20 to the pitch servo motor 22. The pitch servo motor, mounted on the support member 12, is mechanically coupled to the shaft 16 and drives the pitch gyroscope 14 relative to the support member to maintain the output axis of the gyroscope aligned parallel in one plane with the direction of the local vertical to define a reference pitch roll plane. The pitch gyroscope 14 is slaved by the accelerometer 24 which is mounted upon the shaft 16 for rotation therewith. The accelerometer 24 input axis is aligned parallel with the spin reference axis of the gyroscope 14 and is maintained in the horizontal plane. The pitch accelerometer 24 responds to the gravitational acceleration of the earth to develop an acceleration signal which is applied through the servo amplifier 26 to the torque motor 28 of the pitch gyroscope 14. Thus the pitch gyroscope is precessed in accordance with gravitional acceleration to maintain the output axis thereof in a plane with the local vertical direction and hence to maintain the accelerometer in the horizontal plane. A pitch transmitter synchro 30 is coupled with the shaft 16 to develop a pitch signal voltage corresponding to angular displacement of the longitudinal axis of the aircraft from its quadrature relation to the local vertical, i.e. the aircraft angular displacement about its pitch axis.

The roll gyroscope 32 is mounted upon the support member 12 through the intermediary of the rotatable shaft 34 for rotation therewith. The shaft 34 and the input axis of the roll gyroscope 32 coincide with the roll or longitudinal axis of the aircraft. The output axis and the spin reference axis of the roll gyroscope are oriented as indicated and thus the signal generator 36 of the roll gyroscope develops a signal voltage corresponding to angular displacement about the input axis. This signal voltage is coupled through the servo amplifier 38 to the roll servo motor 40 which is mounted on support member 12 and is mechanically coupled to the shaft 34. The roll gyroscope 32 is rotatably driven relative to the support member to maintain its output axis aligned parallel in one plane with the local vertical to define a reference pitch plane. The roll gyroscope 32 is slaved by the roll accelerometer 42 mounted upon the shaft 34 for rotation therewith with its input axis parallel to the spin reference axis of the gyroscope. The roll accelerometer 42 responds to the gravitational acceleration of the earth to develop a signal voltage which is indicative of departure from the local vertical and which is applied through the servo amplifier 44 to the torque motor 46 of the roll gyroscope. Thus, the roll gyroscope is precessed to maintain its output axis in a plane with the local vertical. A roll transmitter synchro 48 mounted upon the support member 12 is coupled to the shaft 34 and develops a roll signal voltage which corresponds to the angular displacement of the transverse axis of the aircraft from its quadrature relation with the local vertical, i.e. the angular displacement of the aircraft about its roll axis.

The azimuth gyroscope 50 is mounted upon the support member 12 by the rotatable shaft 52 which coincides with the yaw axis of the aircraft. The input, output, and spin reference axes of the azimuth gyroscope are oriented as indicated in FIGURE 1. Accordingly, the azimuth gyroscope precesses in response to rotation about the azimuth axis and the signal generator 54 develops a signal voltage corresponding to such rotation which is applied through the servo amplifier 56 to the azimuth servo motor 58. This servo motor is mounted on support member 12 and mechanically coupled with the shaft 52 for rotation thereof relative to the support member in accordance with the azimuth gyroscope displacement signals to maintain the output axis at a known angular position in a plane mutually perpendicular to the reference pitch and roll planes to define a reference azimuth plane. The direction of the output axis, for the condition illustrated in the drawing, is parallel to the aircraft pitch axis in a known direction relative to the north direction, i.e. in a north-reference direction. During alignment, the output axis of azimuth gyroscope is oriented in the reference azimuth plane, but its initial condition may cause the output axis to be in any direction relative to the longitudinal axis of the aircraft, depending upon the direction the aircraft is pointing. The azimuth gyroscope 50 is slaved by a conventional flux valve compass 60 which develops an output signal voltage corresponding to the departure of the aircraft heading or longitudinal axis from the north-reference direction. This flux valve signal voltage is coupled through a differential synchro 62 to develop an error signal which is applied through the servo amplifier 64 to the torque motor 66 of the azimuth gyroscope 50 to cause precession thereof to correct its reference position. A differential synchro 68 mounted on the support member 12 is coupled to the shaft 52 and is rotatably displaced thereby an amount corresponding to the angular displacement between the output axis of the azimuth gyroscope 50 and the support member. This angular displacement is a measure of the aircraft true heading only if the aircraft pitch angle, or the roll angle, or both pitch and roll angles, are equal to zero. In case neither the pitch angle nor the roll angle are equal to zero the measured yaw angle must be corrected to obtain an indication of the true heading. The computation of this correction is accomplished by the heading correction or Sigma computer 70 to be described presently.

Figure 2:
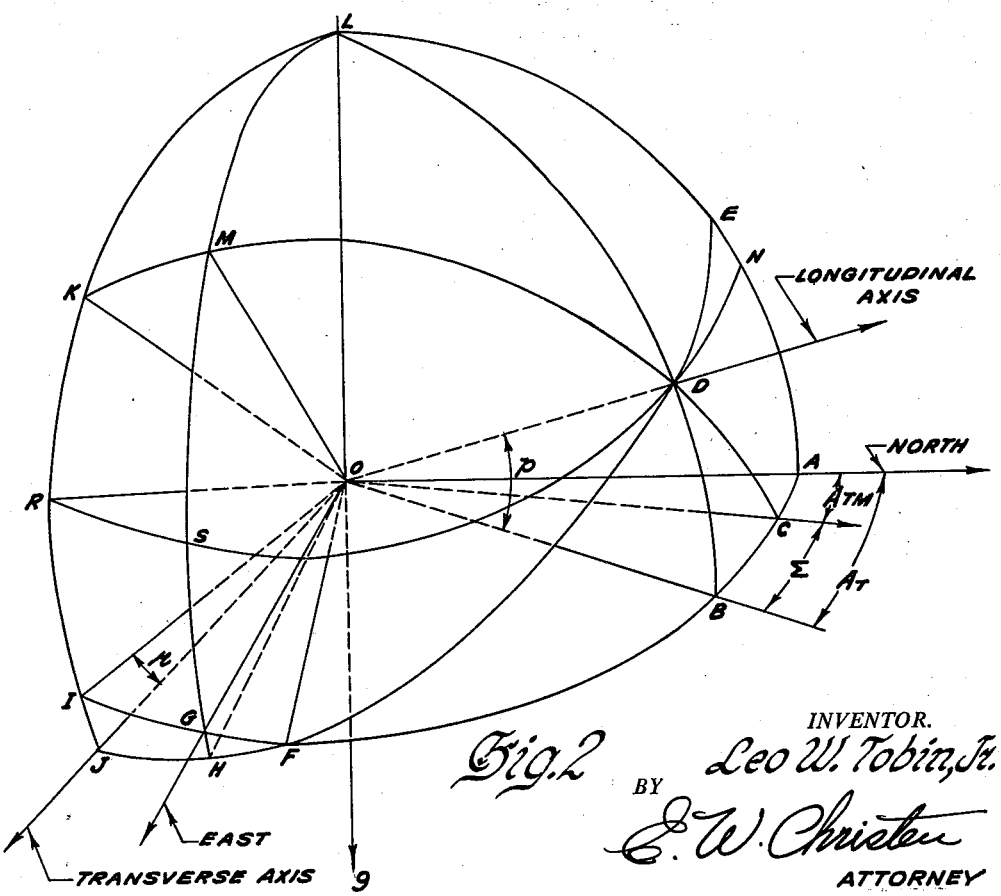
FIGURE 2 represents the spherical geometry of the heading correction problem.

The problem involved in computing the correction of the measured heading and the manner of its solution may be understood from a consideration of the heading correction spherical triangle shown in FIGURE 2. In this geometrical representation, the horizontal plane is represented by plane AOIGFBC with the orientation relative to the north and east directions as indicated. The plane LDBO is a vertical plane. With the aircraft longitudinal axis represented by the line OD, the floor plane of the aircraft is represented by, and hence the aircraft transverse axis lies in, the plane JHFDE and the aircraft yaw axis lies in the plane KMDC. The aircraft true heading $A_T$ is represented by the angle BOA. The aircraft pitch angle $p$ is represented by the angle DOB and the aircraft roll angle $r$ is represented by the angle IOJ. If either the pitch angle $p$ or the roll angle $r$ is equal to zero, then the angular displacement of the output axis of the azimuth gyroscope 50 is angle BOA, which is the aircraft true heading $A_T$. However, if neither the pitch nor the roll angle is equal to zero, as in the case illustrated, the angular displacement of the output shaft of the azimuth gyroscope 50 is represented by angle COA which is the aircraft measured heading $A_{TM}$. It is apparent therefore that the difference between the true heading $A_T$ and the measured heading $A_{TM}$ is the angle represented by BOC which is the heading correction term sigma ($\Sigma$). It is desired to express the correction term sigma in terms of pitch angle $p$ and roll angle $r$. Referring to the spherical triangle BDC, it is apparent that the pitch angle $p$ equals angle DOB. The tangent to the line LDB at the point D is perpendicular to plane RSDN and hence plane AOIGFBC and the tangent to line KMDC at point D is perpendicular to plane JHFDE. Since the planes AOIGFBC and JHFDE are angularly displaced by the roll angle $r$, then the tangent lines and hence the angle BDC is equal to the roll angle $r$. The triangle BCD is a right spherical triangle and by Napier's rules $$\tan \Sigma = \sin p \tan r$$

The Sigma computer 70 is adapted to compute the value of the correction term sigma in accordance with the foregoing expression an add the value of sigma to the existing measured heading $A_{TM}$. The stabilizer 10 continuously supplies the value of pitch angle $p$ and roll angle $r$ as shaft position. The value of $\sin p$ is generated by the sine function resolver or transmitter 72 driven by the shaft 16 upon which the pitch gyroscope is mounted. The development of a voltage corresponding to $\tan \Sigma$ is suitably accomplished by a first tangent generator 74. This tangent generator includes a resolver 76 having its rotor coupled with the roll axis shaft 34 and hence continuously displaced in accordance with roll angle $r$. The excitation for the resolver 76 includes the voltage $\sin p$ from the transmitter 72 which is applied, with the indicated phase, to one input 78 of the electrical differential 80. The differential output 82 is coupled through the amplifier 84 to the rotor winding 86 of the resolver 76. The excitation also includes a feedback voltage $\sin p \cdot \sec r \cdot \cos r$ derived by the stator winding 88 of the quadrature related stator windings 88 and 92. This feedback voltage is applied, with the relative phase indicated, to the input 90 of the electrical differential 80 and thus the output 82 and resultant excitation corresponds to the algebraic sum of the input quantities. The output voltage $\sin p \cdot \tan r$ is derived on the other stator winding 92 and corresponds to the value of tangent $\Sigma$. It is desired to develop the value of sigma as a discrete shaft rotation and this is accomplished by a second tangent generator 94 including a resolver 96. The excitation for this resolver 96 includes an arbitrary voltage $e$ which is applied, with the phase indicated, to the input 98 of the electrical differential 100 and through the amplifier 102 to the rotor winding 104. The excitation also includes a feedback voltage $e \cdot \sec \Sigma \cdot \cos \Sigma$ developed by the stator winding 106 of the quadrature related windings 106 and 110 and applied, with the relative phase indicated, to the input 108 of the differential 100. The inputs 108 and 98 are of opposite sense and the output 99 represents the algebraic sum of the input quantities. An output voltage $e \tan \Sigma$ from the resolver 96 is developed on the stator winding 110 and applied to the multiplier 112. The multiplier 112 is of any conventional form and is excited with the arbitrary voltage $e$ and has an input voltage $e \tan \Sigma$. The multiplier 112 is adapted to develop an output voltage corresponding to the product of input voltage and the reciprocal of the excitation voltage. The output voltage $\tan \Sigma$ is thus developed and applied, with the phase indicated, to the input 116 of the electrical differential 114. The value of $\tan \Sigma$, as developed by the first tangent generator 74, is also applied with the phase indicated to the other input 118. Thus the output 119 of the differential 114 corresponds to the algebraic sum of the two input quantities and is applied through servo amplifier 120 to the servo motor 122 which is mechanically coupled through shaft 108 to the rotor of the resolver 96. The motor 122 is thus energized in the appropriate sense to reduce the value of error voltage at output 119 of the differential 114 to zero. In this condition the input 116 must be equal to the input 118, i.e. $\tan \Sigma$, and accordingly, the angular position of the resolver rotor winding 104 and hence shaft 109 must represent the value of sigma. A voltage corresponding to the value of sigma is developed by a synchro transmitter 124 mechanically coupled to motor 122 through shaft 109.

In order to add the value of heading correction term sigma to the measured heading $A_{TM}$ these quantities are combined in the differential synchro 68. The voltage $\Sigma$ developed by the transmitter 124 is connected through conductor 126, with the phase indicated, to one input 128 of the differential synchro 68. The shaft 52 of the azimuth motor 58 is coupled, for rotation in the phase sense indicated, to the mechanical input 132 of the differential synchro 68. Thus the electrical output 134 of the synchro 68 corresponds to the sum of the input quantities $\Sigma$ and $A_{TM}$ which represents the true heading $A_T$ and is applied, with the phase indicated, to the electrical input 136 of the differential synchro 138. The electrical output 142 of this differential synchro is applied through the servo amplifier 144 to the servo motor 146 which drives the mechanical input 140 of the differential 138, in the phase sense indicated, to produce an angular position of shaft 148 which corresponds to true heading $A_T$. The shaft 148 is mechanically coupled to the mechanical input 150 of the differential synchro 62. The electrical input 63 and the mechanical input 150 of this differential are of opposite phase sense and hence the electrical output 65 is maintained at null value to complete the slaving loop for the azimuth gyroscope 50.

The stabilization signal voltages which represent displacement of the aircraft axes from the reference coordinate axes are thus developed with the azimuth or true heading voltage on conductor 152, the pitch angle voltage on conductor 154 and the roll angle voltage on conductor 156. It will be appreciated that the amplitude and phase of each of these signal voltages represents the extent and direction of angular displacement of the corresponding aircraft axis about the reference coordinate orientation. These signals may be applied to any desired apparatus on the aircraft requiring stabilization.

In a typical application, the vertical periscope 194 is stabilized about a line of sight having a true bearing. For this purpose, a settable angle generator 158 is provided to establish a desired line of sight and is mechanically coupled to the mechanical input 160 of the differential synchro 162 in the phase sense indicated. It is necessary to generate the line of sight relative bearing $\theta$ to provide the desired stabilization. For this purpose the true heading voltage $A_T$ on conductor 152 is connected, in the phase indicated, with the electrical input 164 of the differential synchro 162. Accordingly, the difference of these input quantities is developed by the electrical output 166 and corresponds to the line of sight relative bearing $\theta$. The relative bearing $\theta$ is applied, with the phase indicated, to the electrical input 168 of the differential synchro 170 and the output 172 is coupled through the servo amplifier 174 to the servo motor 176 having an output shaft 178 which drives the mechanical input 180 of the differential 170 to produce a shaft position corresponding to the line of sight relative bearing $\theta$. The output shaft 178 is mechanically coupled through shaft 182 to the resolver 184. The resolver 184 receives the pitch angle voltage $p$ and the roll angle voltage $r$ as input voltages from conductors 154 and 156, respectively, and thus develops the output voltage $r_\theta$ on conductor 186 and the output voltage $p_\theta$ on conductor 188. The shaft 178 also drives the synchro transmitter 200 which develops an output voltage $\theta$ on conductor 202. The signal voltages $r_\theta$ on conductor 186 and the signal voltage $\theta$ on conductor 202 are applied directly to the vertical periscope 194. The signal voltage $p_\theta$ on conductor 188 is applied to the polar converter 198. The settable angle generator 158 is mechanically coupled through shaft 204 with the synchro transmitter 206 to develop the line of sight true bearing voltage $\phi$ on conductor 208 which is also applied to the polar converter 198. The polar converter 198 responds to the input voltages thus developed, together with other input voltages as indicated in FIGURE 3, to develop an output voltage $B - p_\theta$ which is applied through conductor 210 to the vertical periscope 194.

In operation, the stabilizer 10 is erected and aligned in the aircraft at the departure point. The output axis of the pitch gyroscope 14 is aligned parallel to the local vertical in a plane perpendicular to the aircraft pitch axis, and the output axis of the roll gyroscope 32 is aligned parallel to the local vertical in a plane perpendicular to the aircraft roll axis. Thus, the intersection of these planes is coincident with the local vertical. The output axis of the azimuth gyroscope 50 is aligned in a north reference direction. This configuration defines mutually orthogonal coordinate reference axes which coincide respectively with the north reference direction, the local vertical, and the mutual perpendicular. As the aircraft moves through the air and pitches, rolls, and changes direction at random, the reference axes, as defined by the pitch, roll, and azimuth signal quantities, remain unchanged. Thus, the instantaneous value of pitch angle, corresponding to the angular displacement of the aircraft about the pitch axis, is developed by the synchro 30 as the pitch angle voltage $p$ on conductor 154. Similarly, the instantaneous value of roll angle corresponding to the angular displacement of the aircraft about the roll axis is developed by the synchro 48 as the roll angle voltage $r$ on conductor 156. The instantaneous value of azimuth or heading angle is a function of the angular departure about the aircraft yaw axis which is represented as a shaft rotation by azimuth motor 58 as the aircraft measured heading $A_{TM}$. The aircraft true heading is derived as the summation of the measured heading $A_{TM}$ and the heading correction angle $\Sigma$. The computation is performed by the Sigma computer 70 and the aircraft true heading voltage $A_T$ is developed on conductor 152. Thus the coordinate reference axes previously defined are represented by electrical signal quantities. Accordingly, the displacement of the aircraft about the reference coordinate axes is represented respectively by the pitch voltage $p$, roll voltage $r$, and true heading voltage $A_T$. These reference coordinate signal voltages are applied, after suitable modification, to the vertical periscope 194 or similar apparatus which requires stabilization with respect to the coordinate reference axes.

Although the description of this invention hs been given with respect to a particular embodiment, it is not to be construed in a limiting sense. Many variations and modifications within the spirit and scope of the invention will now occur to those skilled in the art. For a definition of the invention, reference is made to the appended claims.

I claim:

1. The method of providing a coordinate reference system for a vehicle comprising the steps of generating pitch, roll, and azimuth signals corresponding to the angular displacement of said vehicle about its respective pitch, roll, and yaw axes from a datum position in which said axes are aligned with selected external reference axes having a known orientation in space, modifying said azimuth signal in accordance with a predetermined function of the pitch and roll signals to derive a corrected azimuth signal, and applying said pitch, roll, and corrected azimuth signals to utilization means as an indication of the displacement of the vehicle about the reference coordinate axes.

2. The method of providing a coordinate reference system for a vehicle comprising the steps of generating pitch, roll, and azimuth signals corresponding to the angular displacement of said vehicle about its respective pitch, roll and yaw axes from a datum position in which said axes are aligned with selected reference coordinate axes having a known orientation in space, combining a function of said pitch and roll signals with said azimuth signal to develop a corrected azimuth signal, and applying said pitch, roll, and corrected azimuth signals to utilization means as an indication of the displacement of the vehicle about the reference coordinate axes.

3. The method of providing a coordinate reference system for a vehicle comprising the steps of generating pitch, roll, and azimuth signals corresponding to the angular displacement of said vehicle about its pitch, roll, and yaw axes from a datum position in which said axes are aligned with selected reference coordinate axes having a known orientation in space, generating an azimuth correction term corresponding to the arctangent of the product of the sine of the pitch signal and the tangent of the roll signal, and additively combining the azimuth signal and the correction term as an indication of the displacement of the vehicle about the corresponding reference coordinate axis.

4. The method of providing a coordinate reference system for a vehicle comprising the steps of generating pitch, roll, and azimuth signals corresponding to the angular displacement of said vehicle about its pitch, roll, and yaw axis from a datum position in which said axes are aligned respectively with first and second horizontal and a local vertical reference coordinate axes, combining a function of said pitch and roll signals with said azimuth signal to develop a corrected azimuth signal, and applying said pitch, roll, and corrected azimuth signals to utilization means as an indication of the displacement of the vehicle about the reference coordinate axes.

5. The method of providing a coordinate reference system for a vehicle comprising the steps of generating pitch, roll, and azimuth signals corresponding to the angular displacement of said vehicle about its pitch, roll, and yaw axis from a datum position in which said axes are aligend respectively with first and second horizontal and a local vertical reference coordinate axes, generating an azimuth correction term corresponding to the arctangent of the product of the sine of the pitch signal and the tangent of the roll signal, and additively combining the azimuth signal and the correction term as an indication of the displacement of the vehicle about the corresponding reference coordinate axis.

6. The method of providing a coordinate reference system for vehicles comprising the steps of disposing pitch, roll, and azimuth gyroscopes on said vehicle with the input axes thereof aligned with the pitch, roll, and yaw axes, respectively, of said vehicle, erecting the pitch and roll gyroscopes with the output axes parallel to the local vertical, and erecting the azimuth gyroscope with the output axis aligned with a north reference direction to establish reference coordinate axes corresponding to the local vertical, north reference, and a mutually perpendicular direction, generating pitch, roll, and azimuth signals corresponding to the angular displacement of the vehicle about the pitch, roll, and yaw axes from a datum position corresponding to the erected attitude of the gyroscopes, generating an azimuth correction term corresponding to the arctangent of the product of the sine of the pitch signal and the tangent of the roll signal, and additively combining the azimuth signal and the correction term as an indication of the displacement of the vehicle about the corresponding reference coordinate axis.

7. The method of providing a coordinate reference system for a vehicle comprising the steps of generating pitch, roll, and azimuth signals corresponding to the angular displacement of said vehicle about its pitch, roll, and yaw axes from a datum position in which said axes are aligned with selected reference coordinate axes having a known orientation in space, generating an azimuth correction term corresponding to the arctangent of the product of the sine of the pitch signal and the tangent of the roll signal, and applying the pitch signal, the roll signal, and the sum of the azimuth signal and correction term to utilization means as a measure of the displacement of said vehicle from the reference coordinate axes.

8. A stable reference coordinate system for vehicles comprising means for generating pitch, roll, and azimuth signals corresponding to the angular displacement of the vehicle about its pitch, roll, and yaw axes from a datum position in which said axes are aligned with selected reference coordinate axes having a known orientation in space, means for generating an azimuth correction signal corresponding to the arctangent of the product of the sine of the pitch signal and the tangent of the roll signal, and means for additively combining the azimuth signal and the azimuth correction signal as an indication of the displacement of the vehicle about the corresponding reference coordinate axis.

9. A stable reference coordinate system for vehicles comprising gyroscopic means adapted to be translationally fixed relative to a vehicle and having three mutually orthogonal input axes corresponding to the pitch, roll, and yaw axes of the vehicle and having two stabilized axes normal respectively to two of said input axes and defining a first reference coordinate axis, and a third stabilized axis normal to the remaining input axis and defining a second reference coordinate axis, a third reference coordinate axis being mutually perpendicular to the first and second reference coordinate axes, pitch, roll, and azimuth signal generator means on the gyroscopic means for developing pitch, roll, and azimuth signal quantities corresponding to angular displacement of the aircraft about its respective axes, and computer means connected with the pitch, roll, and azimuth signal generator means for developing a corrected azimuth signal quantity corresponding to displacement of the aircraft about the first reference coordinate axis, the pitch and roll signal quantities corresponding respectively to the aircraft displacement about the second and third reference coordinate axes.

10. A stable reference coordinate system for vehicles comprising means for generating pitch, roll, and azimuth signals corresponding to the angular displacement of the vehicle about its pitch, roll, and yaw axes from a datum position in which said axes are aligned with selected reference coordinate axes having a known orientation in space, means connected with the pitch and roll signal generator means for developing an azimuth correction signal quantity corresponding to the arctangent of the product of the sine of the pitch signal quantity and the tangent of roll signal quantity, means connected with the last mentioned means and the azimuth signal generator means for developing a corrected azimuth signal quantity corresponding to the sum of the azimuth signal quantity and the correction signal quantity, whereby the corrected azimuth signal quantity, the pitch signal quantity, and the roll signal quantity correspond respectively to the vehicle displacement about the first, second, and third reference coordinate axes.

11. A stable reference coordinate system for moving vehicles comprising support means adapted to be fixed relative to a vehicle, pitch and roll gyroscopic means mounted on said support means in translationally fixed position and having input axes adapted for alignment respectively with the pitch and roll axes of said vehicle, said gyroscopic means being mounted for rotation about the respective input axes and erected with the spin axis defining a first reference coordinate axis, an azimuth gyroscope mounted on said support member in translationally fixed position and having an input axis adapted for alignment with the yaw axis of said vehicle, said azimuth gyroscope being mounted for rotation about its input axis and erected with the spin axis defining a second reference coordinate axis and its remaining axis defining a third reference coordinate axis, pitch and roll signal generating means interposed between the gyroscopic means and the support means and responsive respectively to angular displacement of the support means about the pitch and roll axes, azimuth signal generating means interposed between the azimuth gyroscope and the support means and responsive to angular displacement about the yaw axis, the pitch signal quantity being representative of the displacement of said support means about the third reference coordinate axis, the roll signal quantity being representative of the displacement of said support means about said second reference coordinate axis, and computer means responsive to functions of said pitch and roll signal quantities and the generated azimuth signal quantity for developing a corrected azimuth signal quantity representative of the displacement of said support means about said first reference coordinate axis.

12. A stable reference coordinate system for vehicles comprising support means adapted to be fixed relative to a vehicle, a pitch gyroscope mounted on said support means in translationally fixed position for alignment of its input axis with the vehicle pitch axis, a roll gyroscope mounted on said support means in translationally fixed position for alignment of its input axis with the vehicle roll axis, said pitch and roll gyroscopes being mounted for rotation about their respective input axes and erected with their respective output axes in perpendicular planes to define a first reference coordinate axis, an azimuth gyroscope mounted on said support means in translationally fixed position for alignment of its input axis with the vehicle yaw axis, said azimuth gyroscope being mounted for rotation about its input axis and erected with its spin axis defining a second coordinate reference axis and its output axis defining a third coordinate reference axis, pitch, roll, and azimuth signal generators on the respective gyroscopes for developing pitch, roll, and azimuth signal quantities corresponding to the angular displacement of the support means about the respective axis of the aircraft, and computer means connected with the pitch, roll, and azimuth signal generators for developing a corrected azimuth signal quantity corresponding to the displacement of the aircraft about the first reference coordinate axis, the pitch and roll signal quantities corresponding respectively to the aircraft displacement about the second and third reference coordinate axes.

13. In combination with a vehicle, a stable reference coordinate system comprising pitch, roll, and azimuth single-degree-of-freedom integrating gyroscopes mounted for rotation about their respective input axes coincident with the respective pitch, roll, and yaw axes of the vehicle, said pitch and roll gyroscopes being erected with their output axes parallel to the local vertical, said azimuth gyroscope being erected with its output axis parallel to a north reference direction, pitch, roll, and azimuth signal generator means on said gyroscopes for developing, respectively, pitch, roll, and azimuth signals corresponding to the displacement of the aircraft about its axes from the erected attitude of the gyroscopes, azimuth correction term generator means connected with the pitch and roll signal generator means for developing a correction term corresponding to the arctangent of the product of the sine of the pitch signal and the tangent of the roll signal, and signal generator means connected with the last mentioned means and the azimuth signal generator means for developing a corrected azimuth signal corresponding to the sum of the correction term and the azimuth signal.

14. In combination with a vehicle, a stable reference coordinate system comprising pitch, roll, and azimuth single-degree-of-freedom integrating gyroscopes mounted for rotation about the respective input axes coincident with the pitch, roll, and yaw axes of the vehicle, said pitch and roll gyroscopes being erected with their output axes parallel to the local vertical, pitch and roll accelerometers connected respectively in servo loops with the respective pitch and roll gyroscopes to slave the latter to the accelerometers, said azimuth gyroscope being erected with its output axis aligned with a north reference direction, a flux value compass connected in a servo loop with the azimuth gyroscope to slave the latter to the compass, pitch, roll, and azimuth signal generator means on said gyroscopes for developing, respectively, pitch, roll, and azimuth signals corresponding to the displacement of the aircraft about its axes from the erected attitude of the gyroscopes, azimuth correction term generator means connected with the pitch and roll signal generator means for developing a correction term corresponding to the arctangent of the product of the sine of the pitch signal and the tangent of the roll signal, and signal generator means connected with the last mentioned means and the azimuth signal generator means for developing a corrected azimuth signal corresponding to the sum of the correction term and the azimuth signal.

15. A stable reference coordinate system for vehicles comprising means for generating pitch, roll, and azimuth signals corresponding to the angular displacement of the vehicle about its pitch, roll, and yaw axes from a datum position in which said axes are aligned with selected reference coordinate axes having a known orientation in space, means for correcting the azimuth signal in accordance with an azimuth correction angle including a first tangent generator connected with the last mentioned means and responsive to the pitch and roll signals for developing a signal corresponding to the tangent of the azimuth correction angle, a second tangent generator connected with the first tangent generator for developing a correction signal corresponding to the correction angle, and means for additively combining the correction signal and the azimuth signal as an indication of the displacement of the vehicle about the corresponding reference coordinate axis.

References Cited in the file of this patent

UNITED STATES PATENTS

| | | |
|---|---|---|
| 2,595,309 | Slater | May 6, 1952 |
| 2,623,714 | Slater | Dec. 30, 1952 |
| 2,649,264 | Slater | Aug. 18, 1953 |
| 2,752,792 | Draper | July 3, 1956 |
| 2,762,123 | Schultz | Sept. 11, 1956 |
| 2,835,131 | Vacquier | May 20, 1958 |
| 2,945,643 | Slater | July 19, 1960 |

OTHER REFERENCES

Aviation Week, March 17, 1958, pp. 73–76.